W. M. McCONAHEY.
COMBINATION TRANSFORMER AND CIRCUIT BREAKER.
APPLICATION FILED OCT. 31, 1913.
1,270,850.
Patented July 2, 1918.
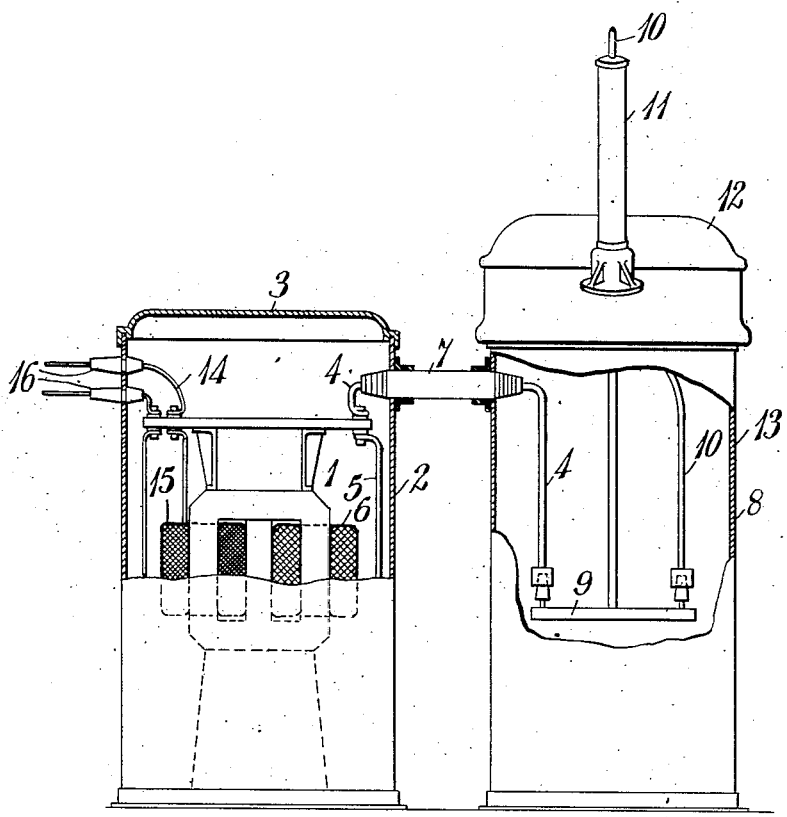
WITNESSES:
Fred H Miller
Geo. W. Hansen
INVENTOR
William M. McConahey
BY
ATTORNEY

UNITED STATES PATENT OFFICE.

WILLIAM M. McCONAHEY, OF PITTSBURGH, PENNSYLVANIA, ASSIGNOR TO WESTINGHOUSE ELECTRIC AND MANUFACTURING COMPANY, A CORPORATION OF PENNSYLVANIA.

COMBINATION TRANSFORMER AND CIRCUIT-BREAKER.

1,270,850.      Specification of Letters Patent.      Patented July 2, 1918.

Application filed October 31, 1913. Serial No. 798,479.

*To all whom it may concern:*

Be it known that I, WILLIAM M. McCONAHEY, a citizen of the United States, and a resident of Pittsburgh, in the county of Allegheny and State of Pennsylvania, have invented a new and useful Improvement in Combination Transformers and Circuit-Breakers, of which the following is a specification.

My invention relates to electrical apparatus, and it has for its object to provide an improved means for the disposition of electrical apparatus that shall be specially simple and economical of space and that shall involve the use of a minimum number of insulating bushings.

High-voltage transformers are usually positioned in inclosing cases or tanks which serve as a protective means and which contain oil or other insulating fluid adapted for cooling and for insulating the coils of the transformer. In order to transmit the energy to and from the transformer, it is necessary to provide suitable bushings through which leads or conductors connected to the transformer coils may extend. Similarly, insulators must be employed with the circuit interrupter associated with the transformer for protecting the leads which connect transformer coils and the transmission conductors to the switching members of the circuit interrupter. On high-voltage circuits, the expense involved in supplying these insulating bushings is considerable.

According to my invention, I place a high-tension transformer in a case which contains insulating fluid and which is provided with high-tension bushings, the said bushings also being common to the case containing the circuit interrupting apparatus. In this way, I reduce the number of insulating bushings required for the above-mentioned combination.

For a better understanding of the nature, the scope and the characteristic features of my invention, reference may be had to the following description and the accompanying drawing in which the single figure is a view, partially in elevation and partially in section, of a device embodying a form of my invention.

Referring to the drawing, a transformer 1 is contained in a tank 2 which is provided with a solid cover 3. Leads 4, connected to the terminals 5 of a high-tension winding 6, pass through high-tension bushings 7 which are common to the transformer and to the circuit interrupter 8, said bushings being shown as of the condenser type. Switching members 9 connect the high-tension leads 4 to outlet leads 10 which pass through high-tension bushings 11 secured to a cover 12 of the containing case 13 of the circuit interrupter.

Energy is supplied from a source (not shown) through leads 14 to a low-tension winding 15 of the transformer 1. The leads 14 are insulated from the case 2 by means of low-tension bushings 16 which may be of any suitable construction. By reason of the high voltage induced in the winding 6, bushings 7 must be constructed to withstand the potential strains imposed thereupon, and, consequently, the cost of supplying the said bushings is considerable. By placing the case 2 of the transformer and the case 13 of the circuit interrupter a short distance from each other, and by providing the walls thereof with properly positioned openings, the bushings 7 may be utilized to insulate the high-tension leads 4 from the transformer case 2 and the circuit interrupter case 13. By the arrangement of apparatus substantially shown in the drawing, the cover 3 of the transformer tank 2 may be cast solid, inasmuch as it is not necessary to furnish the said cover with high-potential outlet bushings.

From the foregoing description, it is apparent that I provide the transformer and the circuit interrupter with a minimum number of bushings and also maintain the said devices in distinct and separate inclosing cases. In addition to saving the cost of supplying numerous high-tension bushings required in the usual arrangement, I provide an effective combination which requires a small amount of installation space. Particularly is this true when condenser-type bushings are employed, as in the present case. It is well known that the length of the stepped-off portion at the end of a condenser-type bushing is a function of the potential for which said bushing is designed, the length of said stepped-off portion being considerable with a high-tension bushing. By employing a single bushing for each lead, as herein indicated, the necessity of locating stepped-off portions, of minimum permissible length, between the two containers is avoided and said containers may, therefore, be much more closely located than would otherwise be possible. Again, my invention may be advantageously employed in outdoor installations, inasmuch as the cost of the equipment will be considerably less than that furnished heretofore for similar service.

I claim as my invention:

1. The combination with a main electrical apparatus, a containing case therefor, and a second case containing an auxiliary apparatus, of rigid condenser type insulating bushings that project into both of said cases for the electrical connectors between said main and auxiliary apparatus.

2. The combination with a main electrical apparatus, a fluid-containing case therefor, an auxiliary apparatus, and a separate fluid containing case therefor, of condenser-type insulating bushings common to both cases and supported in the walls thereof, and conductors which extend through said bushings and interconnect the said main and auxiliary apparatus.

3. The combination with a main electrical apparatus, a containing case therefor, a case containing circuit interrupting means for said main electrical apparatus, said second case being spaced a short distance from said first containing case, of condenser-type insulating bushings common to both cases and supported in the walls thereof, whereby connectors between said main and auxiliary apparatus may be electrically insulated from the said cases.

In testimony whereof, I have hereunto subscribed my name this 22nd day of Oct., 1913.

WILLIAM M. McCONAHEY.

Witnesses:
CHARLES FORTESCUE,
B. B. HINES.